United States Patent [19]

Engelberg et al.

[11] Patent Number: 4,572,485
[45] Date of Patent: Feb. 25, 1986

[54] APPARATUS FOR MELTING A MELTING STOCK COMPOSED OF SCRAP METAL AND/OR COARSE SCRAP MATERIAL

[75] Inventors: Franz Engelberg, Constance, Fed. Rep. of Germany; Luciano Fabris, Kreuzlingen, Switzerland; Robert Schneider, Jestetten, Fed. Rep. of Germany; Gerhard Villinger, Kreuzlingen; Walter Truninger, Tägerwilen, both of Switzerland

[73] Assignee: Gautschi Electro-Fours SA, Tägerwilen, Switzerland

[21] Appl. No.: 643,050

[22] Filed: Aug. 22, 1984

[30] Foreign Application Priority Data

Aug. 25, 1983 [CH] Switzerland ............ 4636/83

[51] Int. Cl.[4] .............................. F27D 3/18
[52] U.S. Cl. .................... 266/227; 266/233; 266/238; 266/900; 266/901
[58] Field of Search ........... 266/200, 215, 227, 233, 266/236; 75/238, 900, 901, 65 R, 68 R

[56] References Cited

U.S. PATENT DOCUMENTS

| 1,513,875 | 11/1924 | Wilke | 75/65 R |
| 3,272,619 | 9/1966 | Sweeney et al. | 75/68 R |
| 3,770,420 | 11/1973 | Spear | 75/68 R |
| 4,007,036 | 2/1977 | Gottschol et al. | 75/65 R |
| 4,177,065 | 12/1979 | Clumpner | 75/68 R |

FOREIGN PATENT DOCUMENTS 8300165  1/1983  European Pat. Off. ............ 266/901

Primary Examiner—Melvyn J. Andrews
Attorney, Agent, or Firm—Werner W. Kleeman

[57] ABSTRACT

A charge channel opens into a primary melting chamber and comprises a substantially vertically extending first section and a second section which follows the first section and opens substantially tangentially into a cylindrically shaped bottom portion of the primary melting chamber. The charge channel is charged with melting stock by means of a funnel-shaped melting stock infeed. A jet of molten metal is fed into the first section by passage means comprising a pump and a conduit. The jet of molten metal is mixed in this first section with the melting stock which is infed into and passed through the first section in a free-falling movement. The melting stock is enclosed and entrained by the jet of molten metal which is tangentially injected into the melt-containing bottom portion of the primary melting chamber. A turbulent flow is thereby generated in the primary melting chamber and keeps the melting stock in motion during finish melting. The melt is removed via an overflow structure arranged in the primary melting chamber and counter-directed to the turbulent flow therein, along a flow separation lip and through an outfeed channel.

12 Claims, 9 Drawing Figures

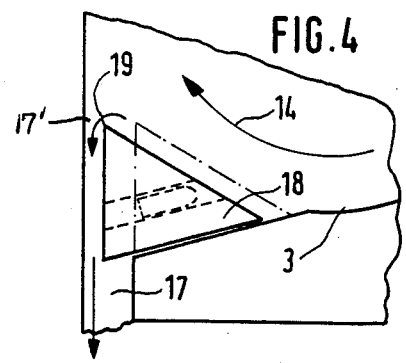
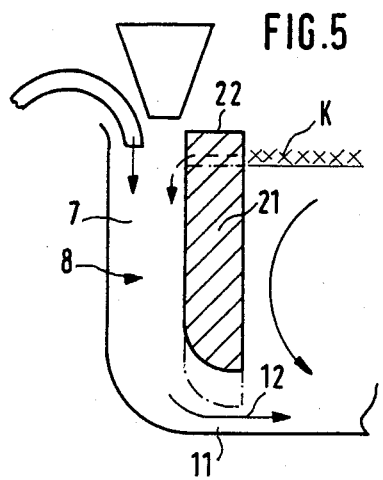
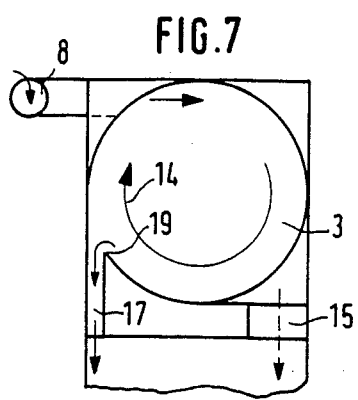
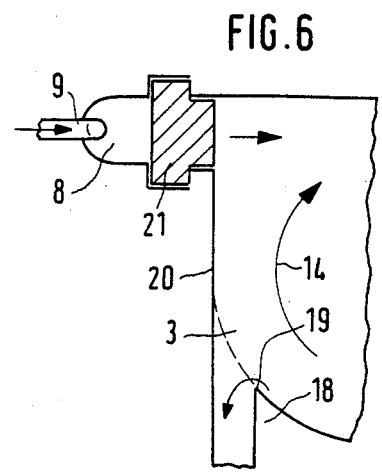
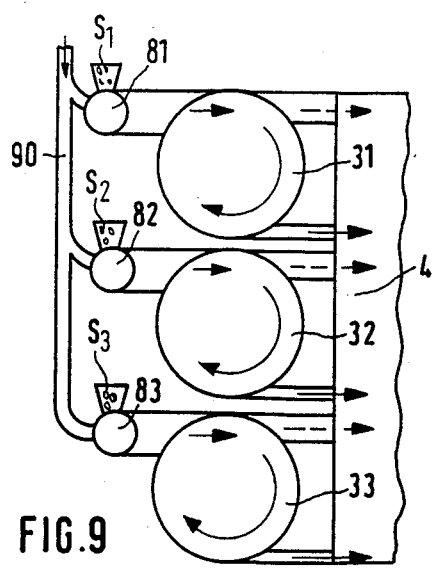
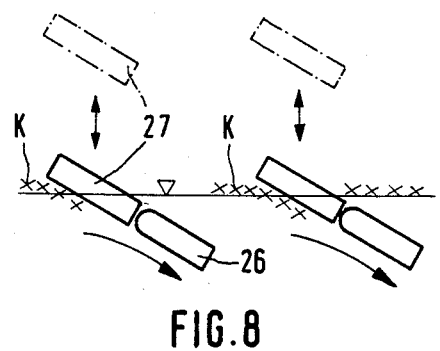

APPARATUS FOR MELTING A MELTING STOCK COMPOSED OF SCRAP METAL AND/OR COARSE SCRAP MATERIAL

BACKGROUND OF THE INVENTION

The present invention relates to a new and improved method of, and apparatus for, melting in a bath of molten metal a melting stock which is composed of fractured or comminuted scrap metal and/or highly contaminated, slag-rich coarse scrap material.

The coarse scrap material, for example, constitutes dross or other scrap material which is comminuted in a mill. The term "dross" designates a type of slag which contains metal oxide, metal and other contaminants. This material floats to the surface of the melt in a melting furnace and is removed or scraped-off the melt at predetermined time intervals.

In order to process such scrap metal, particularly in order to recover the metal from this scrap material, it is known to melt-out the scrap material in a rotary kiln which contains a salt bath. A disadvantage of such method is the low efficiency of energy utilization and the burden it places on the environment. The thermal energy remaining in the flue gases of the flame burners which are used for heating cannot be directly further used in a recuperator because the flue gases contain aggressive components. The base salts which are required for the process in a proportion of about 30 percent of the molten metal must be melted conjointly with the scrap material which requires an additional expense of energy. The environment is burdened by the salt vapors which are formed while the method is carried out. A further detriment to the environment is the salt slag which is obtained after termination of the process and which has to be deposited at a waste dump location or has to be stored and regenerated using technically expensive processes.

Another method of processing scrap metal, particularly scrap material from non-ferrous metals as known, for example, from German Patent Publication No. 2,241,070, uses pocket or crucible melting furnaces in which the scrap material is melted by direct heating in a primary melting chamber. The scrap material to be melted is preferably pre-heated and slides along the bottom of the primary melting chamber. This bottom forms a slide and the scrap material thereon is pre-molten by the burning gases which exit from a burner and directly impinge on the scrap material. The material slides on the slide into a secondary melting chamber in which it is completely melted by means of the radiative heat of further burners.

The melting capacity of this arrangement is comparatively low in relation to the volume of the metal bath. It is a further disadvantage of the known process that high metal losses occur and that there is a tendency to form lumps or agglomerations due to oxidation during the melting operation in the open melting pocket.

Additionally, flux additives are required to liquify the slag and energy losses occur due to over-heating of the metal bath which can be prevented only with difficulty and due to radiation from the surface of the melting pocket.

SUMMARY OF THE INVENTION

Therefore, with the foregoing in mind, it is a primary object of the present invention to provide a new and improved method of, and apparatus for, melting in a bath of molten metal a melting stock composed of fractured or comminuted scrap metal and/or highly contaminated, slag-rich coarse scrap material in a manner which is not afflicted with the aforementioned drawbacks and limitations of the prior art methods and constructions heretofore discussed.

Another and more specific object of the present invention is directed to the provision of a new and improved method of, and apparatus for, melting in a bath of molten metal a melting stock composed of fractured or comminuted scrap metal and/or highly contaminated, slag-rich coarse scrap material in a manner such that the supplied energy is put to optimum use and that environmental burdens due to the presence of salts are avoided.

Still a further significant object of the present invention is directed to the provision of a new and improved method of, and apparatus for, melting in a bath of molten metal a melting stock composed of fractured or comminuted scrap metal and/or highly contaminated, slag-rich coarse scrap material, which permits extensive melting-out of the metal contained in slag-rich materials at comparatively short dwell times, whereby the melting costs and the energy consumption can be reduced.

Now in order to implement these and still further objects of the present invention, which will become more readily apparent as the description proceeds, the method of the present development is manifested by the features that, the free-falling melting stock is mixed with a jet of molten metal, entrained thereby and substantially tangentially injected into a substantially cylindrical bottom portion of a primary melting chamber which contains a melt. Therein a turbulent flow is generated and such keeps the melting stock in motion during finish melting. The melt is then removed from the bath along a breaking edge or flow separation lip via a weir or overflow which is arranged in the primary melting bath in counter-direction to the turbulent flow.

The jet of molten metal impinges on the free-falling melting stock and thereby the melting stock is instantaneously and practically completely enclosed by the molten metal, whereby any oxidation and the formation of lumps or agglomerates are prevented. The melting stock which is pre-treated in the aforementioned manner is injected in a region close to the bottom of the primary melting chamber which is filled with the melt. This injection and the turbulence generated thereby in the primary melting chamber causes a more rapid melting of the metal contained in the scrap material and in the slag which is also a consequence of the continuous disruption of any possibly present insulating zones and of the effective prevention of agglomeration. There is also achieved an improvement in the melting-out operation because the melting stock remains immersed in the bath of molten metal for a longer time, i.e. the slag contained in the melting stock floats to the surface at a later time.

Advantageously, and in order to increase the intensity of turbulence in the primary melting chamber, further melt is injected in the manner of a jet in the rotary direction of the turbulent flow into the primary melting chamber at one or more locations above the entry of the melting stock into the primary melting chamber. These jets are additionally and advantageously injected into the primary melting chamber at some downwardly directed inclination. A secondary flow is thereby superimposed on the turbulent flow.

As alluded to above, the invention is not only concerned with the aforementioned method aspects, but also relates to a novel construction of apparatus for carrying out the method. Generally speaking, the inventive apparatus for melting in a bath of molten metal a melting stock composed of fractured or comminuted scrap metal and/or highly contaminated, slag-rich coarse scrap material comprises a charge channel charging the melting stock and opening into a primary melting chamber and outfeed channels for respectively removing slag and melt from the primary melting chamber.

To achieve the aforementioned measures, the inventive apparatus for melting in a bath of molten metal a melting stock composed of fractured or comminuted scrap metal and/or highly contaminated, slag-rich coarse scrap material, in its more specific aspects, comprises:

a substantially vertically extending section of the charge channel;

a further section of the charge channel following the vertically extending section thereof and substantially tangentially opening into a substantially cylindrically shaped bottom portion of the primary melting chamber; and means for feeding a jet of molten metal into the first-mentioned section and which jet is mixed in this section with the infed free-falling melting stock prior to entering the primary melting chamber conjointly therewith.

A specifically advantageous construction of such apparatus comprises a slag outfeed channel which is connected to the primary melting chamber in the rotary direction of the turbulent flow therein and substantially tangentially at the level of the slag layer floating on the melt in the primary melting chamber and an outfeed channel for removing melt from the primary melting chamber which is also substantially tangentially connected thereto and counter-directed to the rotary direction of the turbulent flow. As a result of the occurring centrifugal forces, the slag is thereby automatically forced into the slag outfeed channel while melting stock particles or pieces which are floatingly entrained by the turbulence are guided past the melt outfeed opening.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein:

FIG. 4 is a top plan view of a second embodiment of the apparatus according to the invention and shows in detail the design of a melt outfeed from the primary melting chamber;

FIG. 5 is a sectional view of a third embodiment of the apparatus according to the invention and shows a detail of the transition from the primary melting chamber to a melt container;

FIG. 6 is a horizontal section of the apparatus shown in FIG. 5;

FIG. 7 is a top plan view of a fourth embodiment of the apparatus according to the invention and shows the primary melting chamber therein;

FIG. 8 illustrates a fifth embodiment of the apparatus according to the invention and shows a detailed view of the construction of the wall of the primary melting chamber therein; and FIG. 9 is a schematic illustration of a sixth embodiment of the apparatus according to the invention which includes a number of primary melting chambers.

DETAILED DESCRIPTION OF THE PREFERRED EMBODIMENTS

Figure 1:
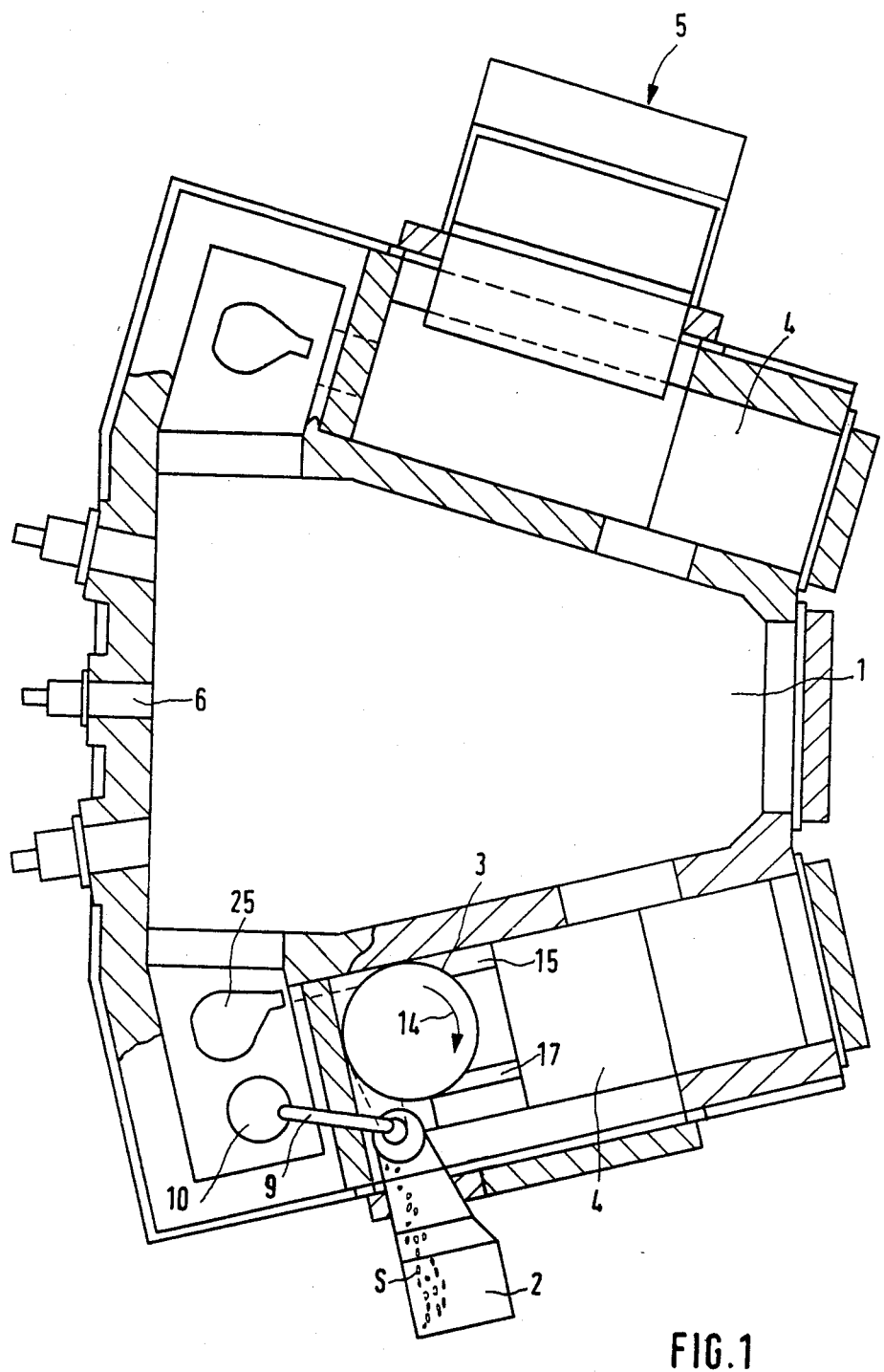
FIG. 1 is a horizontal section through part of a first embodiment of the apparatus according to the invention for melting aluminum.

Describing now the drawings, it is to be understood that only enough of the construction of the melting apparatus has been shown as needed for those skilled in the art to readily understand the underlying principles and concepts of the present development, while simplifying the showing of the drawings. Turning attention now specifically to FIG. 1, there is shown a horizontal section through a first embodiment of the apparatus according to the invention which is part of an aluminum smelting installation for various kinds of melting stock S in the form of coarse scrap material and/or scrap metal like, for example, chips or turnings, fractured scrap metal or scrap metal which has been comminuted, for example, in a ball mill. The scrap material may also comprise, for example, crown sealing caps and the like. The melting stock preferably is pre-heated by utilizing waste heat and is infed by funnel-shaped melting stock infeed means 2 into a primary melting chamber 3 which contains a bath of molten metal. The material is molten and freed of slag in the primary melting chamber 3 prior to being supplied in the form of a melt to a melt container 4. The melt is removed from the melt container 4 and collected prior to further processing in a large furnace chamber 1 which is heated by burners 6.

An analogous arrangement 5 comprising a primary melting chamber 3 and a melt container 4 is arranged on the opposite side of the large furnace chamber 1.

Figure 3:
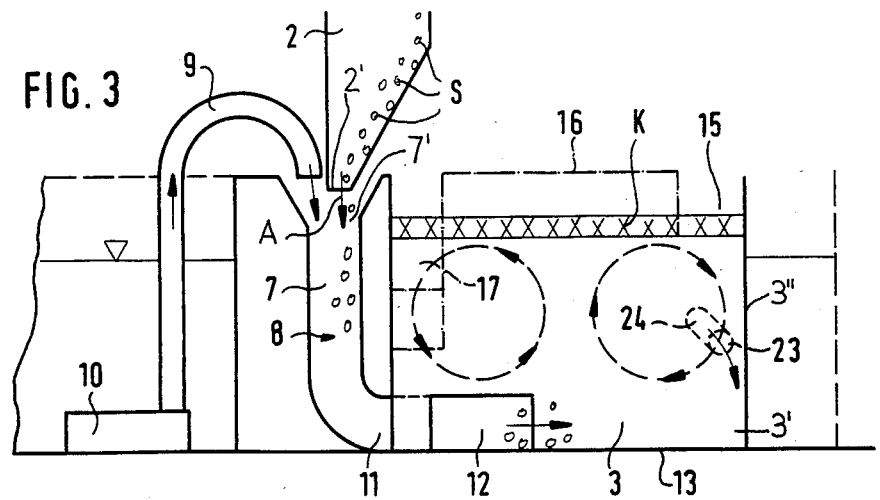
FIG. 3 is a vertical section along the line III—III in FIG. 2.
Figure 2:
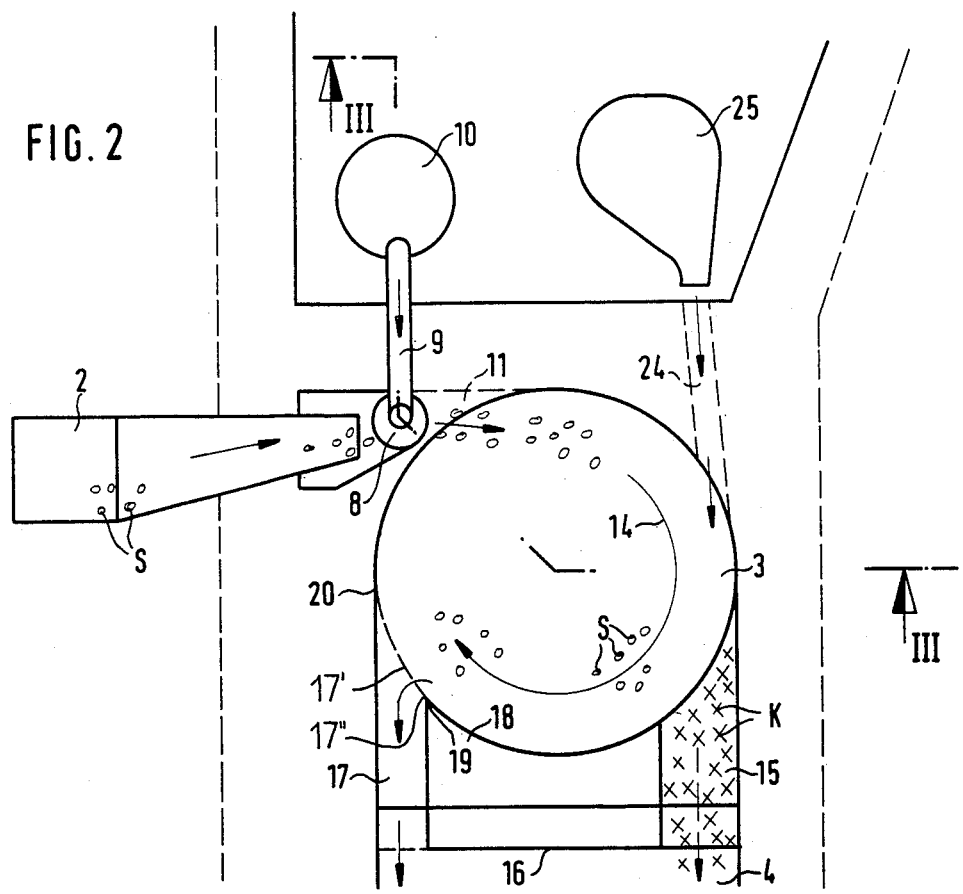
FIG. 2 is a top plan view at an enlarged scale of part of the apparatus shown in FIG. 1.

As will be recognized from FIGS. 2 and 3, the melting stock S which leaves the funnel-shaped melting stock infeed means 2 through a charging opening 2' moves in free fall in a charging direction A through an upper or first section 7 of a J-shaped charge channel 8. The first section 7 thereof extends substantially vertically and has an opening 7' located approximately adjacent the charging opening 2' of the funnel-shaped melting stock infeed means 2. A jet of molten metal which is withdrawn, for example, from the melt container 4 or the large furnace chamber 1 is infed by passage means 9, 10 comprising a conduit 9 and a pump 10 in the region of the opening 7' into the first section 7 of the charge channel 8 at high velocity and substantially axially parallel to the first section 7 substantially in the charging direction A. The jet of molten metal is directed onto the melting stock S free-falling in the first section 7 and instantly mixes therewith and practically completely encloses and entrains the melting stock S. The flow rate of the molten metal leaving the conduit 9 and the cross-section of the charge channel 8 are selected such that even specifically lighter, slag-rich coarse scrap material with gas and air occlusions are reliably entrained by the jet of molten metal. Preferably the melting stock S which is continuously infed in a metered manner is further passed through a suitable screen or sieve in order to retain larger pieces of coarse scrap material which could obstruct the charge channel 8.

The jet of molten metal and the melting stock S then enter a curved second section 11 of the charge channel 8 which follows the vertical first section 7 thereof and substantially tangentially opens into the primary melting chamber 3 through an infeed opening 12 which is closely located to the bottom or floor 13 of the primary melting chamber 3 and through which the jet of molten metal with the entrained melting stock S is substantially tangentially injected into the primary melting chamber 3. A bottom portion 3' of the primary melting chamber 3 is of substantially cylindrical structure at least in the region of the level of the infeed opening 12. A turbulent flow having a rotary direction which is indicated by the arrow 14 in FIG. 2 is generated in the bath of molten metal which is already present in the primary melting chamber 3 by the molten metal and the melting stock S which are substantially tangentially injected into the bottom portion 3' of the primary melting chamber 3. The melting stock S is moved in the turbulent flow along circular travel paths during finish-melting and is thereby prevented from rapidly ascending to the surface. The extended dwell time achieved thereby results in an improved melting-out of the metal components from the coarse scrap material before the remaining slag or dross K accumulates at the surface of the bath of molten metal contained in the primary melting chamber 3, see FIG. 3.

A first outfeed channel 15 is substantially tangentially connected to the primary melting chamber 3 in the rotary direction 14 of the turbulent flow therein and the bottom or floor of the first outfeed channel 15 is arranged approximately at the level of the bath of molten metal. Due to the turbulent flow the slag or slag layer K which floats on the surface of the bath of molten metal in the primary melting chamber 3 is forced off into the first outfeed channel 15 and thus is directly removed. As shown in the illustrated embodiment the slag K can also enter the melt container 4 and it can be withdrawn therefrom by removal or withdrawal means which are conventionally structured and operated and therefore not particularly shown.

In a modified first embodiment of the apparatus according to the invention which is shown by dash-dotted lines in FIG. 3 there is provided, in order to increase the slag withdrawal, an upper member 16 of a partition or separating wall between the primary melting chamber 3 and the melt container 4. The upper member 16 can be raised so that the entire width of the melt container 4 is available for slag removal.

The molten metal which accumulates or is obtained in the primary melting chamber 3 leaves the latter in accordance with the volume increase of the molten metal through overflow-type outfeed means comprising an outfeed opening 17' and a second outfeed channel 17 which may form an overflow channel but may also be constructed in the manner of a slot. The second outfeed channel 17 is substantially tangentially connected to the primary melting chamber 3 and counter-directed to the rotary direction 14 of the turbulent flow. A tongue-like support member 18 is arranged intermediate the primary melting chamber 3 and the second outfeed channel 17. A breaking edge or flow separation lip 19, shown in FIG. 2, is formed at an outfeed location 17" at the end of a portion of the circumferential wall 3" of the primary melting chamber 3. The breaking edge or flow separation lip 19 directs the turbulent molten metal under an oblique or flat inclination to a side 20 of the outfeed opening 17' which is oppositely located to the flow separation lip 19 and forms part of the oppositely situated circumferential wall 3" of the primary melting chamber 3. Due to such structure the turbulence in the primary melting chamber 3 is affected or impaired as little as possible. The flow of molten metal which leaves the primary melting chamber 3 through the second outfeed channel 17 at the outfeed location 17" is constricted at the flow separation lip 19, so that the lines of flow are strongly curved at this location. This measure has the advantage that non-molten coarse scrap material cannot enter the second outfeed channel 17 in the region of the flow separation lip 19 but remains within the primary melting chamber 3 due to the inertia forces which are caused by the flow lines curving in a direction towards the turbulent bath of molten metal.

In the second embodiment of the apparatus according to the invention which is illustrated in FIG. 4 the support member 18 including the flow separation lip 19 advantageously is positionally adjustable so that the cross-section of the outfeed opening 17' for the molten metal can be narrowed or widened in order to adapt the outflow of molten metal from the primary melting chamber 3 and thus the level of molten metal in the primary melting chamber 3 to the momentary melting capacity. Such an adjustment of the support member 18 can be achieved, for example, by a displaceable mounting of the support member 18 which mounting can be fixed in different positions as schematically indicated in FIG. 4.

Advantageously, also the cross-section of the charge channel 8 can be designed so as to be adaptable to the momentary requirements. In a third embodiment of the apparatus according to the invention as shown in FIGS. 5 and 6 a partition 21 intermediate the charge channel 8 and the primary melting chamber 3 can be exchanged for a different partition and/or can be vertically adjusted. Thus, different passage cross-sections of the charge channel 8 can be formed by using partitions of different wall thickness. By vertically adjusting the partition 21 the inlet cross-section, i.e. the cross-section of the infeed opening 12, can be varied. Additionally, the third embodiment illustrated by FIGS. 5 and 6 permits a lowering of the partition 21 until the top edge 22 thereof is positioned below the slag K floating on the bath of molten metal. The slag K thereby can be passed again into the charge channel 8 and thus slag pieces possibly still containing metal can be recirculated. The exchangeability and adjustability of the partition 21 additionally facilitates the elimination of eventual obstructions of the charge channel 8.

In the fourth embodiment of the apparatus according to the invention which is illustrated in FIG. 7 just the bottom portion 3' of the primary melting chamber 3 in the region of the level of the infeed opening 12 is of substantially cylindrical structure. Contrary thereto, the upper portion of the primary melting chamber 3 is constructed with a substantially polygonal cross-section. Such a structure will be selected when additional impinging actions are intended for the particles of the melting stock S circulating with the turbulent flow in the primary melting chamber 3. In order to generate and sustain a strong and stable turbulent flow in the primary melting chamber 3 the structure of the flow separation lip 19 and of the adjacent parts of the circumferential wall 3" of the primary melting chamber 3 is significant as mentioned hereinbefore in addition to the substantially cylindrical design of the primary melting chamber 3 in the region of the infeed opening 12 through which the melting stock-molten metal mixture is injected.

Advantageously, the turbulent flow in the primary melting chamber 3 is further assisted by molten metal which is additionally injected in a jet-like manner in the rotary direction 14 of the intended turbulent flow into the primary melting chamber 3 at one or more locations above the infeed or infeed opening 12 of the melting stock S into the primary melting chamber 3.

In the first embodiment of the inventive apparatus which is illustrated in FIGS. 1, 2 and 3 this is achieved by injecting means 23, 24, 25 comprising a conduit 24 with an opening 23 which opens into the primary melting chamber 3, see FIG. 3, and a pump 25 for withdrawing molten metal, for example, from the large furnace chamber 1. The molten metal is thereby substantially tangentially passed into the primary melting chamber 3 in a jet-like manner in the rotary direction 14 of the turbulent flow. The intensity of turbulence in the primary melting chamber 3 can still be further increased when the further jet of molten metal leaving the opening 23 is introduced substantially tangentially in the rotary direction 14 of the turbulent flow into the primary melting chamber 3 at an appropriate distance from the bottom or floor 13 thereof and at a somewhat downwardly directed inclination. If desired, more than one further jet can be injected into the primary melting chamber 3 in this manner.

As illustrated by FIG. 8, the effect of the turbulence can be increased or additionally augmented by providing deflecting means 26 comprising guiding recesses or guiding ribs which are mounted at an inclination at the circumferential wall 3" of the primary melting chamber 3 in such a manner that a first member towards which the flow is directed is located at the top and a second member from which the flow is directed away is located at the bottom. The deflecting means 26 can also be pivotably and/or displaceably arranged. The embodiment illustrated in FIG. 8 comprises deflecting means 26 constituting two-membered guiding ribs, the upper or first members 27 of which can be separated or raised from a stationary or second member as indicated by the bidirectional arrows. In the raised position of the upper or first members 27 illustrated by dash-dotted lines in FIG. 8 the stationary or second members of the deflecting means 26 intensify the turbulent flow only in the bath of molten metal. However, in the lowered position of the upper or first members 27 additionally the slag K floating on the bath of molten metal is immersed into the molten metal for a further melting-out operation. The upper or first members 27 can also or additionally constitute adjustable members.

A sufficient intensity of the turbulent flow and correspondingly large centrifugal forces which act upon the melting stock S cannot be achieved in primary melting chambers having arbitrarily large diameters. Similar to cyclone separators it is valid in the present case that a primary melting chamber of larger diameter can be employed for processing coarser and specifically heavier coarse scrap material having a high sedimenting rate than for processing more finely and specifically lighter coarse scrap material having a correspondingly lower sedimenting rate. A parallel arrangement of a number of primary melting chambers, therefore, is required for high throughputs of melting stock.

For the processing of melting stock composed of material of very different particle sizes and of very different densities it may be preferable to provide preliminary sorting or screening means for the melting stock which classifies the melting stock and feeds the individual grades of melting stock to a related primary melting chamber of respective optimum size. Such an arrangement containing, for example, three separate primary melting chambers 31, 32, 33 constitutes the sixth embodiment of the apparatus according to the invention which is illustrated by FIG. 9. The melting stock is classified in three grades S1, S2 and S3 and is infed via related separate charge channels 81, 82, 83 into the related primary melting chambers 31, 32, 33. The melt is discharged therefrom into a common melt container 4. In the same manner the jet of molten metal is fed to the charge channels 81, 82, 83 via a common conduit 90.

Instead of connecting the primary melting chambers 31, 32, and 33 in parallel as in the embodiment illustrated in FIG. 9, it is also feasible to series-connect a number of primary melting chambers in the manner of a cascade in order to melt-out even the last residues of metal from the slag of each of the preceding primary melting chambers. Such an arrangement above all is preferred when the coarse scrap material to be processed contains a large number of small particles enclosed by a strong and thick slag layer.

While there are shown and described present preferred embodiments of the invention, it is to be distinctly understood that the invention is not limited thereto, but may be otherwise variously embodied and practiced within the scope of the following claims. ACCORDINGLY,

What we claim is:

1. An apparatus for melting a melting stock comprising a desired one of fractured scrap metal, comminuted scrap metal, highly contaminated coarse scrap material rich in slag, or a mixture thereof in a bath of molten metal underlying a layer of slag, said apparatus comprising:
   a melting furnace;
   a primary melting chamber for the bath of molten metal;
   said primary melting chamber having a substantially cylindrical portion;
   a charging channel opening into said primary melting chamber for charging said primary melting chamber with the melting stock;
   said charging channel comprising a substantially vertically extending first section and having an upper end;
   said charging channel comprising a second section arranged subsequent to said substantially vertically extending first section and opening substantially tangentially into said primary melting chamber at said substantially cylindrical lower portion thereof for feeding said melting stock into said primary melting chamber so as to induce a vortex motion of the bath of molten metal in a rotary direction;
   a charging bin for the melting stock arranged above said upper end of said charging channel;
   a first tubular conduit having an outlet end and cooperating with said charging channel;
   said outlet end of said first tubular conduit being arranged above said upper end of said charging channel;

a first pump for transporting the molten metal through said first tubular conduit to said charging channel a slag removal channel connected to said primary melting chamber for removing slag therefrom;

said slag removal channel being substantially tangentially connected to said primary melting chamber at a height thereof where the layer of slag forms and in the rotary direction of the vortex motion;

a molten metal removal channel connected to said primary melting chamber for removing molten metal therefrom;

said molten metal removal channel being substantially tangentially connected to said primary melting chamber in a direction counter to the rotary direction of the vortex motion;

a second conduit opening into said primary melting chamber at a location above said second section of said charging channel for at least augmenting the vortex motion; and a second pump for transporting molten metal substantially tangentially into said primary melting chamber in the rotary direction of the vortex motion.

2. The apparatus as defined in claim 1, wherein:
said second conduit has an outlet opening into said primary melting chamber at a downwardly directed inclination.

3. The apparatus as defined in claim 1, further including:
a flow separation lip;
said primary melting chamber defining an outfeed opening and an outfeed location for said molten metal communicating with said molten metal removal channel;
said flow separation lip being formed at said outfeed location and defining a side of said outfeed opening which is opposite to said flow separation lip; and
said flow separation lip being arranged for directing molten metal which does not leave said primary melting chamber to said opposite side of said outfeed opening and thereby preventing a discharge of non-molten melting stock.

4. The apparatus as defined in claim 3, further including:
a support member supporting said flow separation lip; and
said support member being positionally adjustable in order to vary said outfeed opening with respect to the cross-section thereof.

5. The apparatus as defined in claim 1, wherein:
said charging channel defines a cross-section; and
said charging channel comprising a member which is exchangeable in order to vary said cross-section of said charging channel.

6. The apparatus as defined in claim 1, wherein:
said charging channel defines a cross-section; and
said charging channel comprising an adjustable member which is adjustable in order to vary said cross-section of said charging channel.

7. The apparatus as defined in claim 1, wherein:
said charging channel defines a cross-section; and
said charging channel comprising a member which is exchangeable and adjustable in order to vary said cross-section of said charging channel.

8. The apparatus as defined in claim 1, further including:
deflecting means;
said primary melting chamber comprising a circumferential wall; and
said deflecting means being arranged at said circumferential wall of said primary melting chamber and extending at an inclination therefrom for intensifying movement of the melting stock in the bath of molten metal.

9. The apparatus as defined in claim 8, wherein:
said deflecting means comprise adjustable deflecting means.

10. The apparatus as defined in claim 8, wherein:
said deflecting means comprise separable deflecting members.

11. The apparatus as defined in claim 8, wherein:
said deflecting means comprise adjustable and separable deflecting members.

12. The apparatus as defined in claim 8, wherein:
said deflecting means comprise guiding ribs.

* * * * *